United States Patent [19]

Caldwell et al.

[11] Patent Number: 5,001,646

[45] Date of Patent: Mar. 19, 1991

[54] AUTOMATED HELICOPTER FLIGHT CONTROL SYSTEM

[75] Inventors: Donald G. Caldwell, Mesa; Stephen S. Osder, Scottsdale, both of Ariz.

[73] Assignee: McDonnell Douglas Corporation, Long Beach, Calif.

[21] Appl. No.: 286,235

[22] Filed: Dec. 19, 1988

[51] Int. Cl.$^5$ .................... B64C 13/04; B64C 13/16
[52] U.S. Cl. .................. 364/434; 364/424.01
[58] Field of Search ............ 364/433, 434, 452, 449; 244/17.11, 17.13, 17.25, 237, 178, 192, 179, 180, 191, 175, 177; 318/584–586

[56] References Cited

U.S. PATENT DOCUMENTS

| | | | |
|---|---|---|---|
| 3,382,283 | 5/1983 | Clelford et al. | 364/434 |
| 3,711,042 | 1/1973 | Rempfer et al. | 244/17.11 |
| 4,116,405 | 9/1978 | Bacchi et al. | 244/12.4 |
| 4,150,686 | 4/1979 | El Sherif et al. | 137/377 |
| 4,243,358 | 1/1981 | Carlock et al. | 416/114 |
| 4,270,168 | 5/1981 | Murphy et al. | 364/200 |
| 4,281,811 | 8/1981 | Nixon | 244/178 |
| 4,313,201 | 1/1982 | Fischer et al. | 371/68 |
| 4,330,829 | 5/1982 | Fischer et al. | 364/434 |
| 4,354,230 | 10/1982 | Murphy et al. | 364/200 |
| 4,355,358 | 10/1982 | Clelford et al. | 364/424 |
| 4,362,085 | 12/1982 | Venuti, Jr. | 91/186 |
| 4,382,281 | 5/1983 | Fowler et al. | 364/424 |
| 4,412,280 | 10/1988 | Murphy et al. | 364/200 |
| 4,420,808 | 12/1983 | Diamond et al. | 364/434 |
| 4,436,018 | 3/1984 | Murphy et al. | 91/363 |
| 4,443,853 | 4/1984 | Maciolek et al. | 364/434 |
| 4,484,283 | 11/1984 | Verzella et al. | 364/434 |
| 4,500,967 | 2/1985 | Murphy et al. | 364/434 |
| 4,517,639 | 5/1985 | Ferrell et al. | 364/186 |
| 4,542,506 | 9/1985 | Oe et al. | 371/9 |
| 4,542,679 | 9/1985 | Murphy et al. | 91/363 |
| 4,563,743 | 1/1986 | Murphy et al. | 318/584 |
| 4,564,908 | 1/1986 | Clelford et al. | 364/433 |
| 4,617,662 | 10/1986 | Auer, Jr. et al. | 371/25 |
| 4,648,345 | 3/1987 | Wham et al. | 114/338 |
| 4,679,151 | 7/1987 | Morris et al. | 364/510 |
| 4,697,768 | 10/1987 | Klein | 364/434 |
| 4,713,757 | 12/1987 | Davidson et al. | 364/200 |
| 4,801,110 | 1/1989 | Skutecki | 244/17.13 |

Primary Examiner—Parshotam S. Lall
Assistant Examiner—Michael Zanelli
Attorney, Agent, or Firm—Curt L. Harrington; George W. Finch; John P. Scholl

[57] ABSTRACT

An apparatus and method for controlling the flight of a helicopter, in which the pilot commands vehicle state changes, embodies several significant advances to the helicopter control art. Among these are control decoupling to reduce undesired helicopter responses in other axes to pilot inputs in one axis, task oriented control modes which are selected automatically, and automatic control of engine torque and rotor speed constraints. Novel task oriented control modes include independent control of heading and ground track at low speed and turn rate and flight path angle control at higher speeds. Control decoupling is achieved through a combination of force/moment decoupling and open loop prediction methods. Vertical control, traditionally accomplished with collective only, is accomplished in this system with a combination of longitudinal cyclic and collective control, increasing vertical response performance and minimizing engine power change demands. These flight control automation methods were designed to enable the use of small displacement, multi-axis controllers for full envelope helicopter control; the system provides dramatic pilot work load reduction for any of wide range of pilot manipulator configurations.

21 Claims, 10 Drawing Sheets

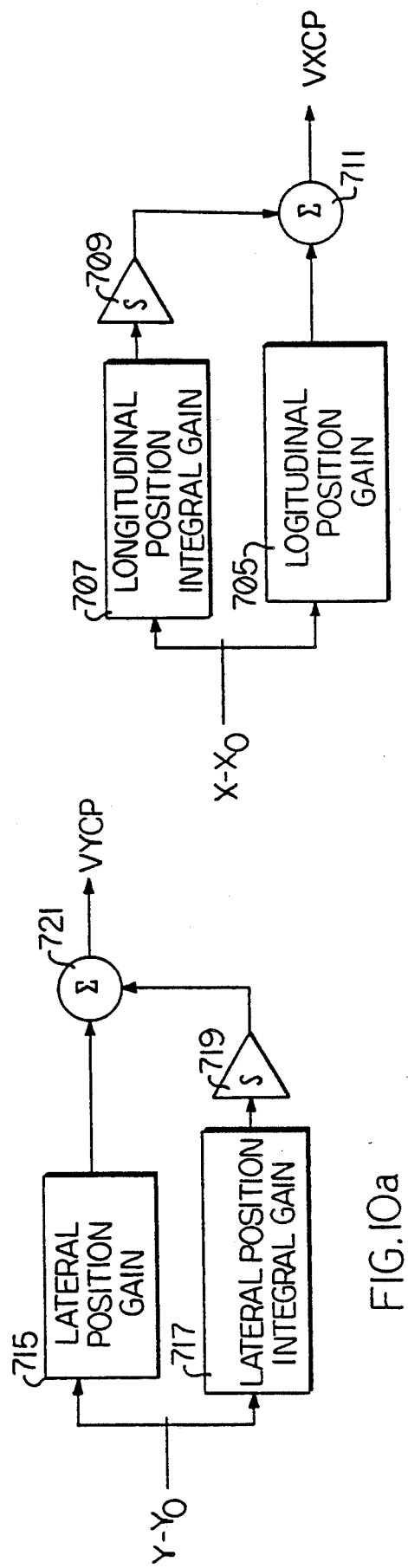

AUTOMATED HELICOPTER FLIGHT CONTROL SYSTEM

BACKGROUND OF THE INVENTION

Helicopter type aircraft are known to be aerodynamically unstable. The piloting process for such vehicles involves the active use of both hands and both feet, as well as close attention to the aircraft attitude. The process is especially complicated due to the interrelated nature of the controls. An increase in the pitch of the main rotor causes a twisting of the aircraft which must be corrected for by an adjustment of the tail rotor. In a similar manner, when the pilot desires to perform a single action with the aircraft, he must simultaneously perform a complex, learned series of actions on the controls in order to achieve the single action.

In addition, helicopter type aircraft typically are able to operate closer to the limit of their material strength and limit of their flight envelope. An overstressing of the aircraft can cause mechanical damage. An over specification of a number of flight characteristics can also push the aircraft beyond its limit, or cause none of the characteristics specified to be achieved.

Although there are numerous examples of advancement of the helicopter control art, each typically deals with a narrow problem and its concomitant narrow solution, such as an engine torque limitation which prevents demands on the engine in excess of the torque limit. One reference, U.S. Pat. No. 4,420,808, E. D. Diamond, et al, inventors, discloses the use of a four axis force stick and a trim controller. The 808' patent recites that it has the ability to provide the capability for a pilot to control an aircraft in response to his perception of changes in attitude, altitude, speed, heading and the like, with control inputs provided by the pilot only in the event that a change in aircraft response is required. The system of the 808' patent, then, is a trim system which sets the controls of a helicopter to their last position. This method does not take into account changing conditions such as wind shifts, or aircraft attitude. Under the system of the 808' patent, it is still the responsibility of the pilot to make the minute control changes necessary to keep the aircraft stable, or steady with respect to a fixed point on the ground. The system of the 808' patent was intended primarily to increase cockpit usable space by integrating the controls into a four axis stick with some form of control.

SUMMARY OF THE INVENTION

The present invention is a fully integrated fly-by-wire system for a helicopter utilizing a ground and inertial reference system and automated stability control to enable vectored directional control of the aircraft The system of the present invention corrects for external changes and uses feedforward and feedback prediction to better implement pilot commands. Acceleration commands enable the system to have greater compatibility with basic attitude stabilization loops currently in use.

Control signals are reduced to their force and moment components and then used according to a weighting matrix. All commands are continually modified by constraint feedbacks to thereby adapt limits of torque, rotor RPM and actuator authority performance envelopes. The built-in synchronization structures allow transient free transition into and out of differing control modes. A vertical flight path energy management system takes vertical commands to produce vertical accelerations, using kinetic to potential energy conversions plus power adjustments for larger maneuver requirements.

The system of the present invention is designed to command computed attitude maneuvers which maximize the response obtainable to an acceleration command. This is especially important in helicopter aircraft where the aircraft attitude is a major determiner of the speed and direction of the maneuver. All control and stabilization functions are decoupled so that the pilot is not required to apply compensating controls in any axis orthogonal to the axis in which commands are inserted.

BRIEF DESCRIPTION OF THE DRAWINGS

The structure and method of operation of the invention, together with additional advantages thereof, will be best understood from the following description of specific embodiments when read in connection with the accompanying drawings, in which.

DETAILED DESCRIPTION OF THE PREFERRED EMBODIMENTS

Figure 1:
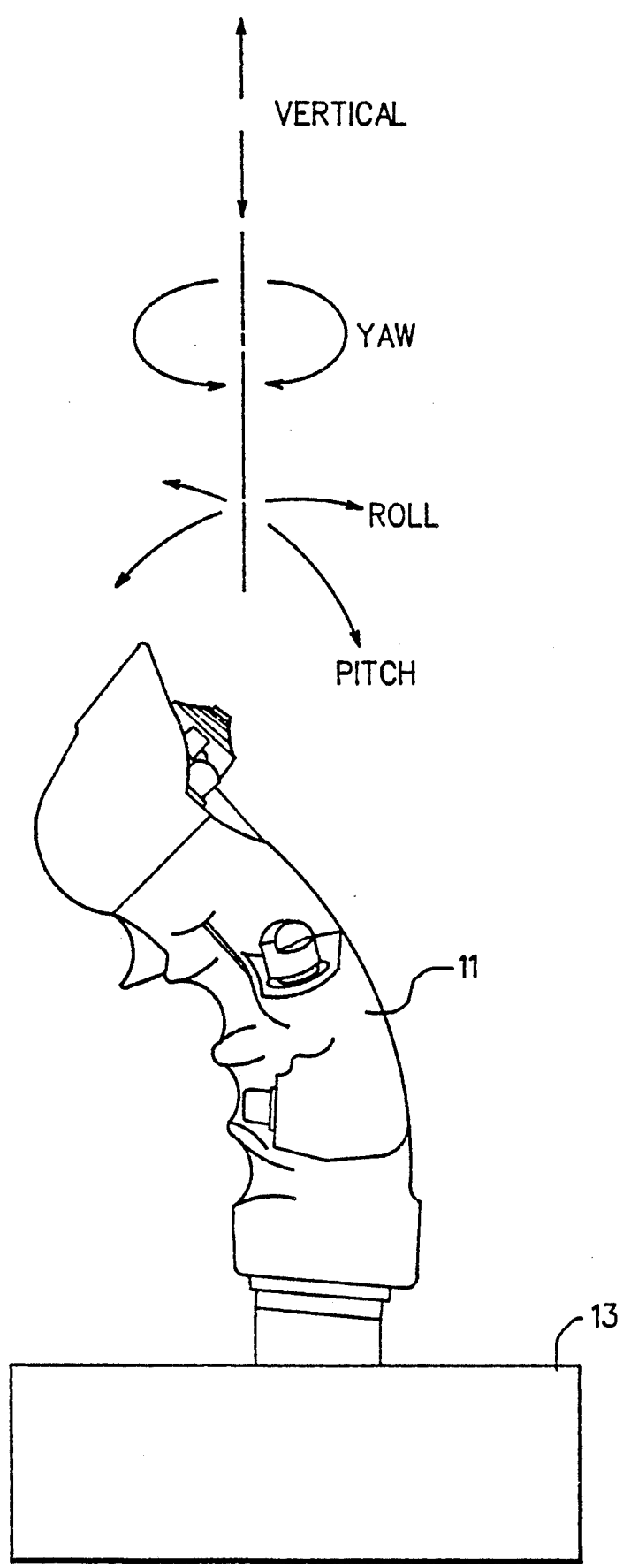
FIG. 1 is an isometric drawing of the control stick which can be utilized to affect command inputs to the system of the present invention.

Referring to FIG. 1, a control stick 11 is movably supported by a support 13. The indicated control movements shown are for vertical, yaw, pitch, and roll, and are indicated by the appropriate directional arrows.

Figure 2:
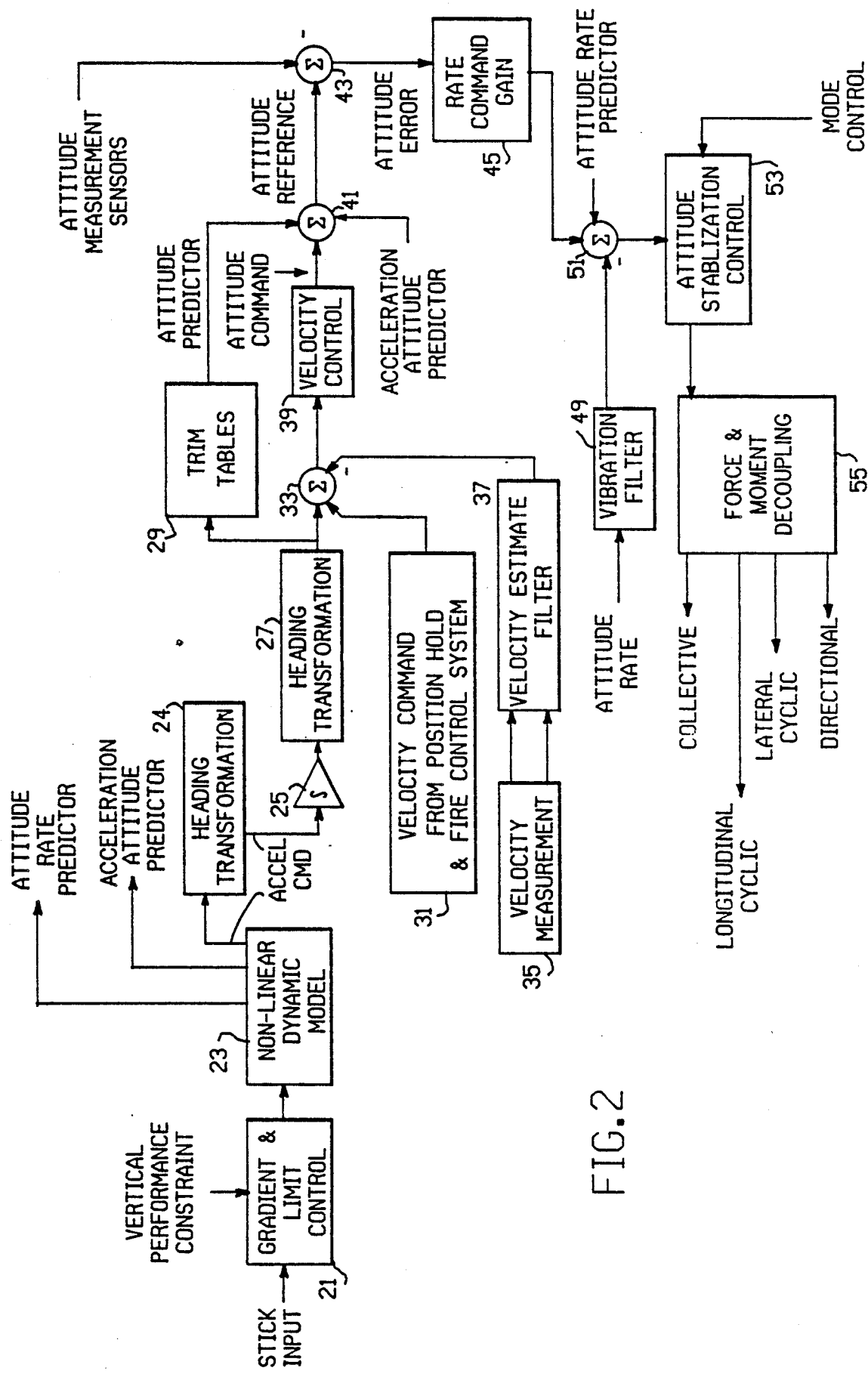
FIG. 2 is a conceptual block diagram of one axis of the acceleration command control system of the present invention driven by the control stick of FIG. 1.

Referring to FIG. 2, a conceptual control path block diagram for one axis of the system of the present invention is shown. Each of the four control axes is a specific realization of this more general figure. It is understood that the diagrammatic representations illustrated herein may be implemented in a digital or analog fashion Stick inputs from control stick 11 representing vector direction command signals are connected to a gradient and limit control block 21. Gradient and limit control block 21 provides limits and modifications to signals received from control stick 11 because of the finite performance limits inherent in the control surfaces of a helicopter. In addition to the finite structural limitations which are constant, a set of limitations due to present operating characteristics, known as performance constraints, are also input into gradient and limit control block 21.

The output from gradient and limit control block 21 is connected to a non-linear dynamic model block 23. In this block, the now limited vector direction command signal from the control stick 11 is used to generate three command components. An attitude rate predictor output from block 23 is a signal indicative of how rapidly the attitude of the aircraft has been commanded to change. An acceleration attitude predictor output from block 23 is a signal indicative of the expected attitude change required of the aircraft to achieve the commanded acceleration. The third output from block 23 is an acceleration command signal The acceleration command signal from block 23 is input into a heading transformation block 24. The heading transformation block 24 resolves aircraft body axis acceleration commands into an earth referenced coordinate frame.

An integrator 25 receives the output from the heading transformation block 24 and performs an integration to calculate a velocity command signal. The velocity command signal from integrator 25 is inputtably connected to a second coordinate transform block 27, where the velocity command signal is transformed back into the aircraft body axis coordinate frame. These blocks 24, 25, and 27 implement one of the very unique features of the present invention, in that stick commands generate acceleration commands in the aircraft coordinate frame; but the resulting velocity command is maintained in an earth referenced frame.

The velocity command signal is first picked off from heading transformation block 27 and inputtably connected to a trim table block 29.

Trim table block 29 estimates the aircraft attitudes required to maintain the commanded velocity. The processing of the velocity command signal by trim table block 29 produces an attitude predict signal.

Beneath coordinate transform block 27 is a velocity commands from position hold and fire control system block. This block provides a steadying input to the system based upon the last command of the position hold and fire control system.

Velocity sensors on the aircraft comprise a velocity measurement block 35. The measured velocity from velocity measurement block 35 is inputtably connected to a velocity estimate filter block 37 in order to reduce any noise or vibration variations in the measured velocity. The negative summing of the output of the velocity estimate filter block 37 with a total velocity command signal creates a velocity error signal.

The velocity command from block 27 is also summed at summing junction 33 with velocity commands from a position hold computation and fire control system block 31 and the output of the velocity estimate filter block 37 to arrive at the total velocity error command.

The velocity error signal from summing junction 33 is connected to the velocity control block 39 which is a proportional plus integral control element. The output of velocity control block 39 is an attitude command signal representing the attitude change required to reduce the velocity error towards zero.

The output from trim tables block 29, the accelleration attitude predictor from non-linear dynamic model block 23, and the output of velocity control block 39 are summed in a summing junction 41 to form an attitude reference signal.

The attitude reference signal from summing junction 41 is introduced into a summing junction 43 where it is summed with a signal which is the negative of the attitude from the attitude measurement sensors. This attitude measurement signal is generated from attitude measurement sensors aboard the aircraft (not shown), and is normally provided by standard aircraft attitude instrumentation. The output of summing junction 43 is the attitude error signal.

The attitude error signal from summing junction 43 is fed into a rate command gain block 45. The gains of the rate command gain block 45 can be varied to affect the desired level of aircraft performance.

A vibration filter block 49 receives an attitude rate measurement signal. The attitude rate measurement signal is also normally provided by standard aircraft attitude instrumentation. The vibration filter block 49 smooths the attitude rate measurement signal to rid it of unwanted vibration to prevent overcontrol. The output of the vibration filter block 49 is negatively summed with the output of the rate command gain block 45 and with the attitude rate predictor signal from dynamic model block 23 in a summing junction 51.

The output of summing junction 51 is fed to an attitude stabilization control block 53. A mode control input to attitude stabilization control block 53 selects which control laws are to treat the signal from summing junction 51. The control laws embodied within attitude stabilization control law block 53 keep track of the physical limits of the aircraft to the extent to which control can be achieved.

The output of the attitude stabilization control law block 53 is fed into a decoupling block 55. Within decoupling block 55 a decoupling matrix operation is performed to calculate the extent to which each output must be actuated in order to effect the stick inputs. The values used in the decoupling matrix at any one time are a function of the degree of interaction among the controlled outputs, as well as the speed and attitude of the aircraft. The outputs of the decoupling block 55 relate to the traditional helicopter aircraft inputs of collective control, longitudinal cyclic control, lateral cyclic control, and directional control. Typically, the helicopter engine's fuel response to increased collective will be handled in a sub control loop not treated here.

It is well known in the helicopter control field that a movement of one control, such as collective, not only produces an aircraft response in the desired axis, such as vertical, but also produces aircraft responses in other axes, such as yaw, pitch, and roll. In conventional helicopter control systems, the pilot must coordinate all four axes of control to produce a desired single axis response. A feature of the present invention performs that coordination automatically, in large part through the decoupling block 55, but also through other control feedback elements. Force and moment decoupling is achieved in decoupling block 55 by apportioning each single input to block 55 into all four control surface command outputs. Each output from block 55 drives an actuator, which may be of the electrohydraulic or other type within the scope of the current art. The actuator, in turn, moves the control surface to which it is attached, thereby effecting the commanded helicopter motion.

FIGS. 1 and 2 illustrate the overall scheme of the present invention. The remaining figures are more detailed control logic diagrams illustrating an intermediate level of control complexity and centering on the general types of control each subscheme is to control. It is understood that each level of control logic is implementable either in analog or digital computer form.

Figure 3:
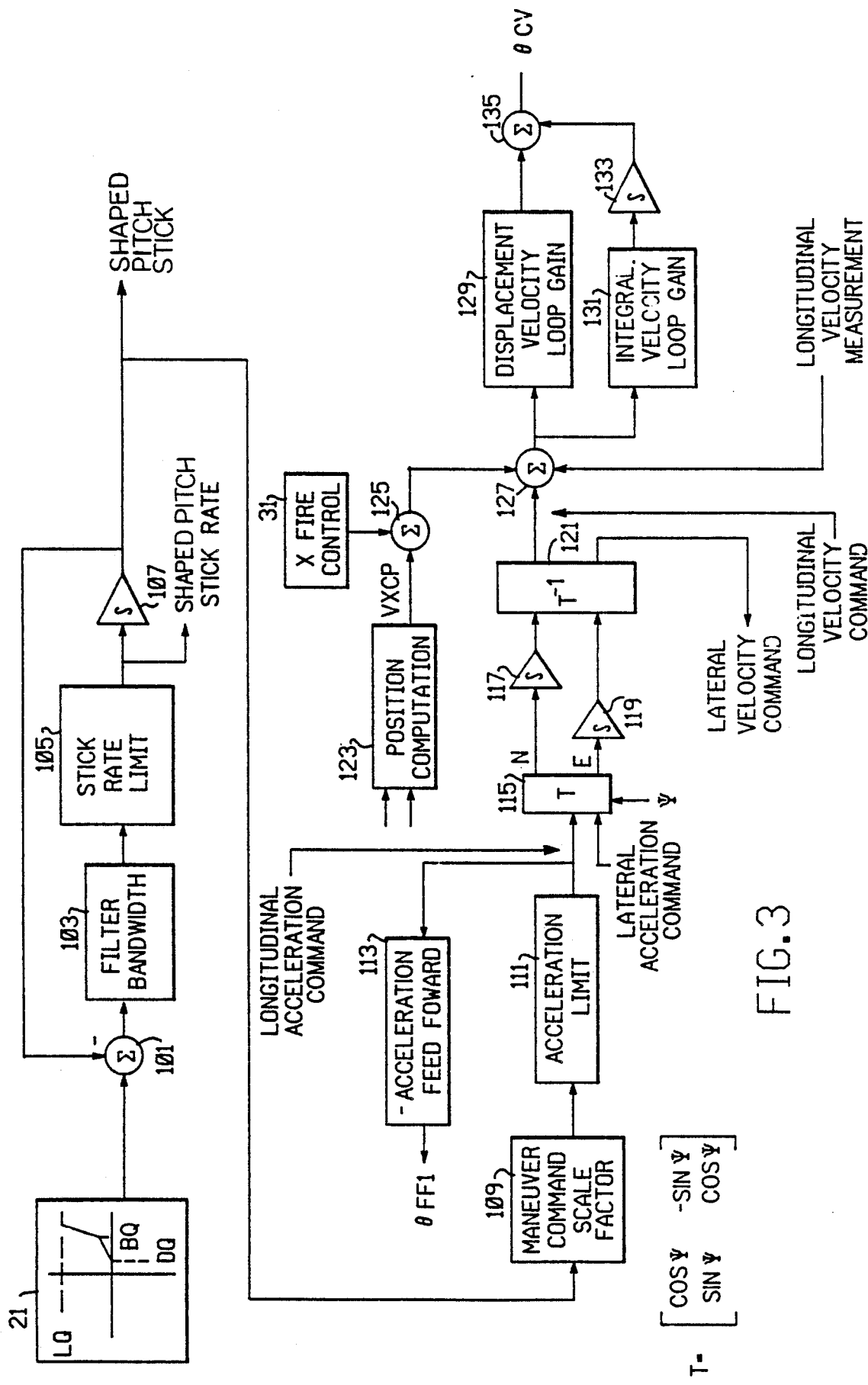
FIG. 3 is a block diagram of the pitch control block incorporated into the conceptual block diagram of FIG. 2.

Referring to FIG. 1, the pitch axis is separate and distinct from the other axes pictured. Although the pilot may activate more than one axis at a time, each axis has its own distinct control limitation curve. Referring to FIG. 3, the longitudinal control scheme, a stick shaping block 21, similar to gradient and limit control block 21 of FIG. 2, is shown in the upper left hand corner of FIG. 3.

The stick shaping block 21 shown in FIG. 3 is specific to the longitudinal control function. The graph in the stick shaping block 21 illustrates the signal output vertically as a function of stick position input horizontally. The LQ line represents the output limit of the stick. The DQ zone just to the right of the vertical axis represents the stick deadzone, the range over which the stick may be moved forward and still produce no output. The point BQ on the horizontal axis represents the transition from a second order output between DQ and BQ to a linear output between BQ and LQ. At BQ, the slope of the second order segment exactly equals the slope of the linear segment. The purpose of the stick shaping function is to provide a low stick gain in the region of neutral stick for precise controllability and a high stick gain in the region of large stick forces for maximum aircraft response. The deadzone region DQ is needed to reject inadvertant pilot inputs which may occur when the pilot unintentionally applies a small force in an axis orthogonal to the axis that he intends to command.

The output of stick shaping block 21 is input into a feedback summing junction 101. Summing junction 101 and blocks 103, 105, and 107 together form a rate limited first order log filter on the shaped stick output of block 21. Filter bandwidth block 103 controls the bandwidth of this low pass filter while stick rate limit block 105 controls the maximum rate of change of the shaped pitch stick output of filter bandwidth block 103. The output of maneuver rate command limit block 105 is fed into integrator block 107. One output of stick rate limit block 105 will be subsequently applied to an input shown later. An output from integrator 107 is also picked off and applied to feedback summing junction 101 to complete the filter implementation.

The shaped pitch stick from the output of the integrator 107 is also fed into a maneuver command scale factor block 109. The output from the maneuver command scale factor block 109 is fed into an acceleration limit block 111. The limitations of acceleration limit block 111 placed upon the signal from maneuver command scale factor block 109 are a function of the limitations of the aircraft based upon its current velocity and current pitch position.

The output of acceleration limit block 111 is the longitudinal acceleration command, and is fed into an acceleration feed forward block 113. The acceleration feed forward block has a gain of the 57.3 degrees to radian conversion divided by 32.2 feet/sec$^2$, the acceleration of gravity and represents the required pitch angle change to achieve the commanded acceleration The sign of the acceleration feed forward block 113 is negative for longitudinal to account for positive (forward) acceleration requiring negative (down) pitch attitude.

The output of acceleration feed forward block 113 is designated $\theta_{FF1}$ for reintroduction into another control sequence shown later.

The longitudinal acceleration command output of acceleration limit block 111 is fed into a body orientation block 115. Body orientation block 115 also receives a lateral acceleration command which will be shown later on FIG. 5. The operation carried on within body orientation block 115 is shown in the lower left half of FIG. 3 as a heading rotation matrix to rotate the acceleration command into an earth referenced north/east coordinate frame.

The outputs of the body orientation block 115 include a north acceleration signal and an east acceleration signal The vertical north acceleration signal is fed into an integrator 117. The output of integrator 117 is a north velocity command which results from the integration of the north acceleration signal The east acceleration signal is fed into an integrator 119. The output of integrator 119 is an east velocity command which results from the integration of the east acceleration signal The east velocity command from integrator 119 and the north velocity command from integrator 117 are rotated back into the body axis frame through an inverse heading rotation matrix block 121. The outputs of block 121 are the longitudinal velocity command and the lateral velocity command.

This rotation, integration, and inverse rotation method allows stick inputs to command body axis accelerations, but the resultant velocity commands are maintained in the earth reference frame. For a helicopter this provides a feature where the aircraft can be turned from its direction of flight to fire at a target, for example, without changing its flight path across the ground.

Above and to the left of the inverse heading rotation block 121 is the position computation block 123. Position computation block 123 receives data from any velocity or position currently available in the instrumentation sensing existing art. Position computation block 123 outputs a longitudinal velocity command which is summmed with the longitudinal velocity command from the fire control system block 31, from FIG. 2, in a summing junction 125. The fire control system block 31 was referred to in FIG. 2, and will not be discussed in greater detail.

The longitudinal velocity is introduced near the bottom right of FIG. 3 and is typically derived from standard inertial, doppler, or other sensors found on aircraft. The longitudinal velocity measurement, the output of summing junction 125, and the longitudinal velocity command velocity commands output of heading rotation block 121 are summed in a summing junction 127 to form a signal indicative of the longitudinal velocity error.

The output of summing junction 127 is fed into the input of a displacement velocity loop gain block 129. The output of summing junction 127 is also fed into the input of an integral velocity loop gain block 131. The output of integral velocity loop gain block 131 is fed into the input of an integrator 133. The output of integrator 133 and the output of displacement velocity loop gain block 129 are summed in a summing junction 135 to form $\theta_{CV}$, the pitch command for velocity loop control.

Figure 4:
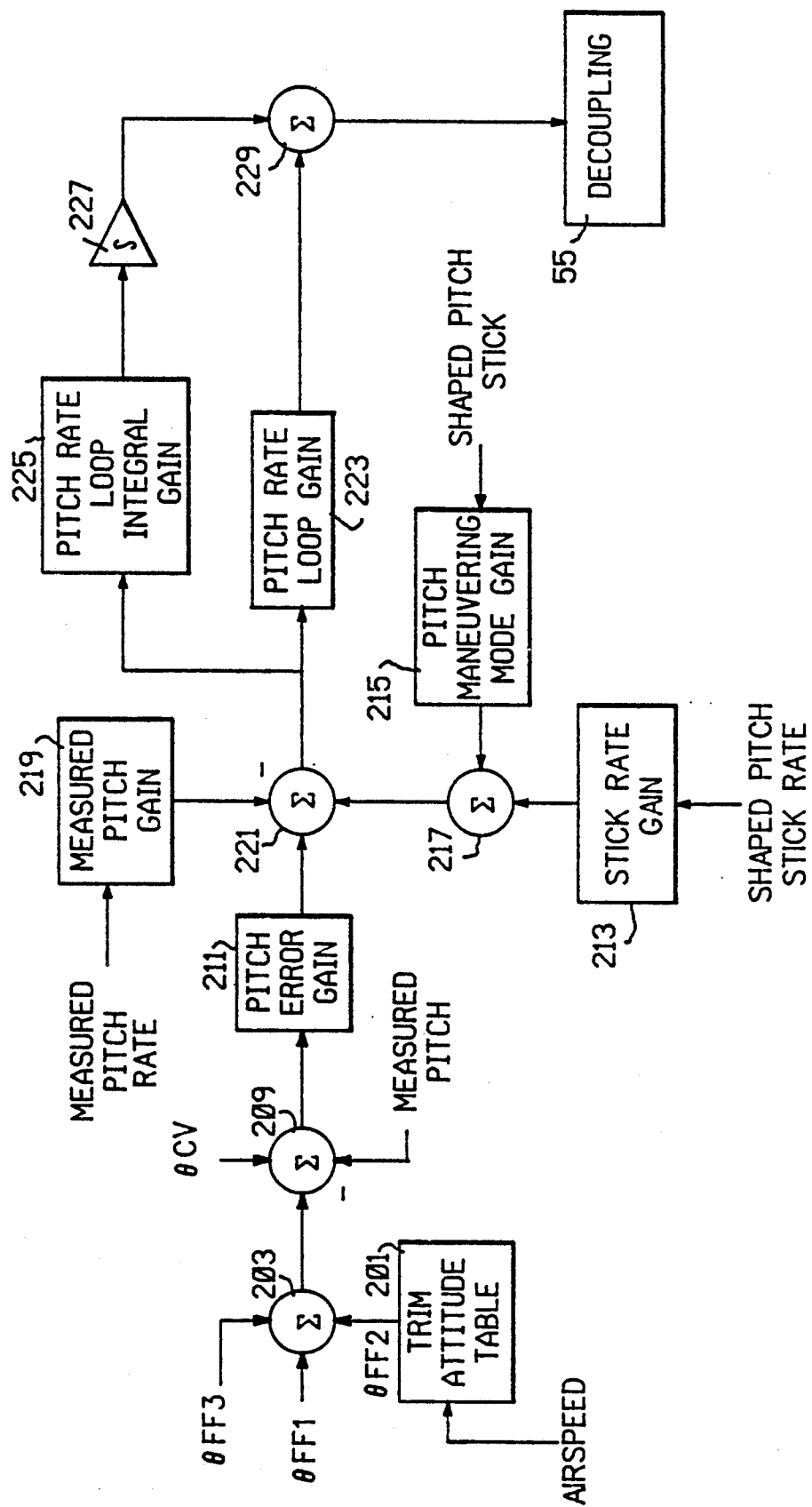
FIG. 4 is a block diagram of the pitch stabilization control block incorporated into the conceptual block diagram of FIG. 2.

Referring to FIG. 4, the pitch stabilization control block diagram is shown. A trim attitude table 201 accepts a calibrated airspeed input. This input is normally available from air data equipment typically available on aircraft. The output of trim attitude table block 201 is the second feedforward pitch signal $\theta_{FF2}$. Also shown on FIG. 4 are the first feedforward pitch $\theta_{FF1}$ signal from acceleration feed forward block 113 of FIG. 3 and the third feedforward pitch signal $\theta_{FF3}$ which emanates from a control loop to be hereinafter discussed in FIG. 8. The first, second, and third feedforward pitch commands, $\theta_{FF1}$, $\theta_{FF2}$, and $\theta_{FF3}$, respectively are summed in a summing junction 203.

Still referring to FIG. 4, the output of summing junction 203 is summed with $\theta_{CV}$ from FIG. 3 at summing junction 209. Further, the measured pitch attitude is negatively summed with the total pitch command at summing junction 209 to form a pitch error signal. The measured pitch signal is normally obtained from aircraft flight data systems typically present on aircraft. The pitch error signal output of summing junction 209 is fed into a pitch error gain block 211.

Near the bottom of FIG. 4, the shaped pitch stick rate quantity from FIG. 3 appears and is fed into a stick rate gain block 213.

The shaped pitch stick quantity from FIG. 3 also appears and is fed into a pitch rate maneuvering mode gain block 215. The output of the pitch maneuvering mode gain block 215 is summed with the output of the stick rate gain block 213 in a summing junction 217 to form the total pitch rate command.

The measured pitch rate quantity, normally obtained from aircraft flight data systems typically present on aircraft, is fed into a vibration filter block 219. The negative of the output of the vibration filter block 219, the total pitch rate command output of the summing junction 217, and the output of the pitch error gain block 211 are summed in a summing junction 221, to produce a pitch rate error signal.

The output of the summing junction 221 is fed into the input of a pitch rate loop gain block 223. The output of the summing junction 221 is also fed into the input of a pitch rate loop integral gain block 225. The output of the pitch rate loop integral gain block 225 is fed to an integrator 227. The output from integrator 227 and the output from pitch rate loop gain block 223 are all summed in a summing junction 229. The output of summing junction 229 is fed into the decoupling block 55 shown previously on FIG. 1.

Figure 5:
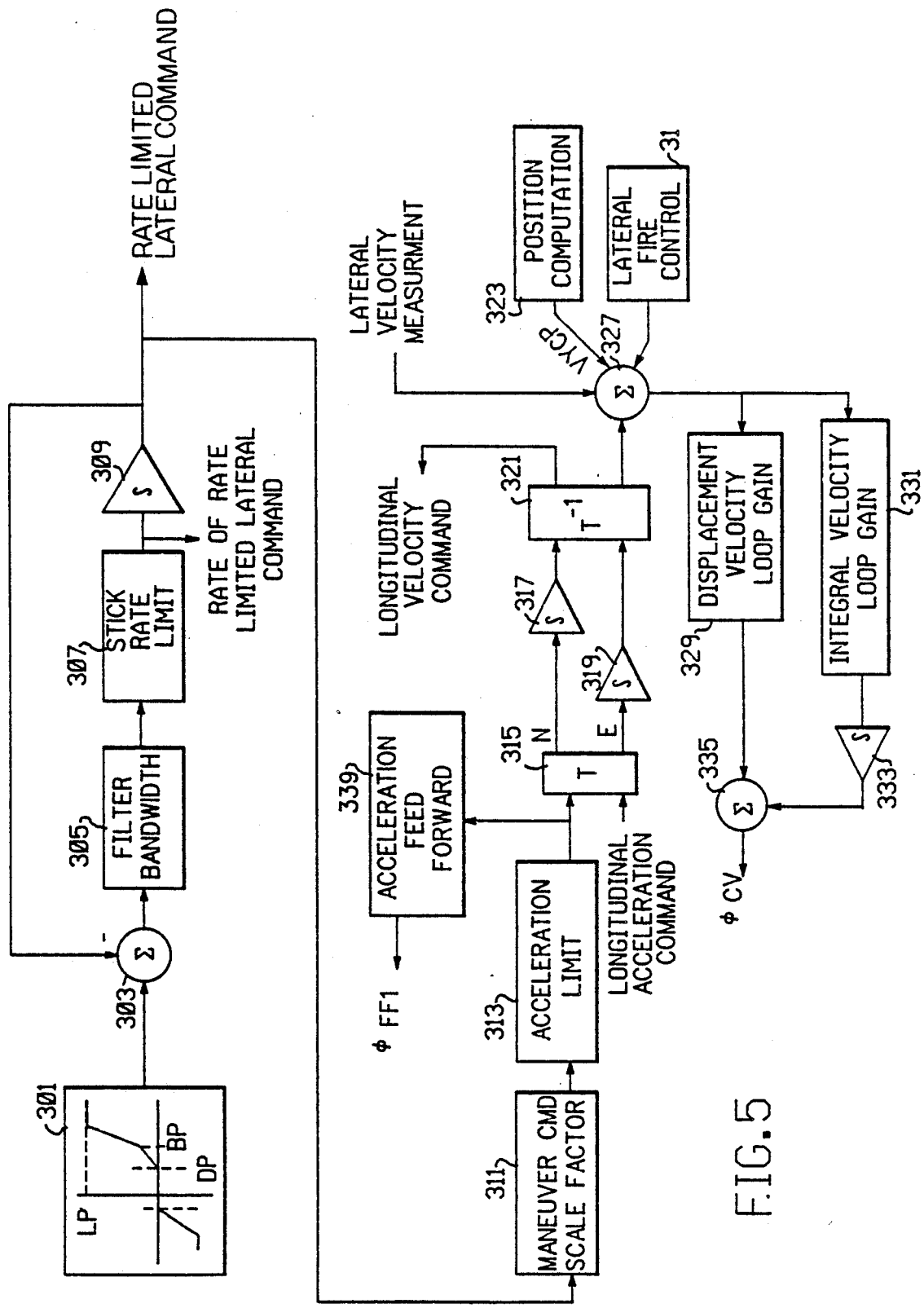
FIG. 5 is a block diagram of the lateral maneuver control block incorporated into the conceptual block diagram of FIG. 2.

Referring to FIG. 5, the lateral maneuver block diagram which is very similar to the longitudinal block diagram FIG. 3 is shown. A stick shaping block 301 in the upper left hand portion of FIG. 5 illustrates the signal emanating from the stick of FIG. 1 as it is actuated in its roll axis. The block 301 is analogous to the stick shaping block 21 of FIG. 2. The block 301 illustrates the extent of the stick limit LP, as well as a stick dead zone DP and a breakpoint BP. The output of stick shaping block 301 is input into a feedback summing junction 303. Summing junction 303 and blocks 305, 307, and 309 together form a rate limited first order log filter on the shaped stick output of block 301. Filter bandwidth block 305 controls the bandwidth of this low pass filter while stick rate limit block 307 controls the maximum rate of change of the shaped pitch stick output of stick shaping block 301. One output of stick rate limit block 307 will be subsequently applied to an input shown later. The other output of stick rate limit block 307 is input into an integrator 309. The output from integrator 309 is picked off and feedback to feedback summing junction 303 to complete the feedback implementation The rate limited lateral command from the output of the integrator 309 is also fed into a maneuver command scale factor block 311. The outPut from the maneuver command scale factor block 311 is fed into an acceleration limit block 313. The limitations of acceleration limit block 313 placed upon the signal from maneuver command scale factor block 311 are a function of the limitations of the aircraft based upon its current velocity and current pitch position.

The lateral acceleration command output of acceleration limit block 313 is fed into a body orientation block 315. Body orientation block 315 also receives the longitudinal acceleration command which was illustrated on FIG. 3. The operation carried on within body orientation block 315 was shown in the lower left half of FIG. 3 as a heading rotation matrix to rotate the acceleration command into an earth referenced north/east coordinate frame.

The outputs of the body orientation block 315 include a north acceleration signal and an east acceleration signal. The north acceleration signal is fed into an integrator 317. The output of integrator 317 is a north velocity command which results from the integration of the north acceleration signal. The east acceleration signal is fed into an integrator 319. The output of integrator 319 is an east velocity command which results from the integration of the east acceleration signal.

The east velocity command from integrator 319 and the north velocity command from integrator 317 are rotated back into the body axis frame through an inverse heading rotation matrix block 321. The outputs of block 321 are the longitudinal velocity command and the lateral velocity command.

This rotation, integration, and inverse rotation method allows stick inputs to command body axis accelerations, but the resultant velocity commands are maintained in the earth reference frame. This provides a feature where the aircraft can be turned from its direction of flight to fire at a target, for example, without changing its flight path across the ground.

To the right of the inverse heading rotation block 321 is the position computation block 323. Position computation block 323 receives data from any velocity or position currently available in the instrumentation sensing existing art. Position computation block 323 outputs a longitudinal velocity command which is summmed with the longitudinal velocity command from the lateral fire control system block 31, from FIG. 2, the lateral velocity measurement which is introduced near the right of FIG. 5 and is typically derived from standard inertial, doppler, or other sensors found on aircraft, and the lateral velocity measurement in a summing junction 327. The fire control system block 31 was referred to in FIG. 2 and will not be discussed in greater detail.

The signal from summing junction 327 forms a signal indicative of the longitudinal velocity error. The output of summing junction 327 is fed into the input of a displacement velocity loop gain block 329. The output of summing junction 327 is also fed into the input of an integral velocity loop gain block 331. The output of integral velocity loop gain block 331 is fed into the input of an integrator 333. The output of integrator 333 and the output of displacement velocitY loop gain block 329 are summed in a summing junction 335 to form $\theta_{CV}$, the pitch command for velocity loop control.

The output of acceleration limit block 313 is the lateral acceleration command and is fed into an acceleration feed forward block 339. The acceleration feed forward block has a gain of the 57.3 degrees to radian conversion divided by 32.2 feet/sec$^2$, the acceleration of gravity, and represents the required pitch angle change to achieve the commanded acceleration. The output of acceleration feedforward block 339 is designated $\phi_{FF1}$ for reintroduction into another control sequence shown later.

Figure 6:
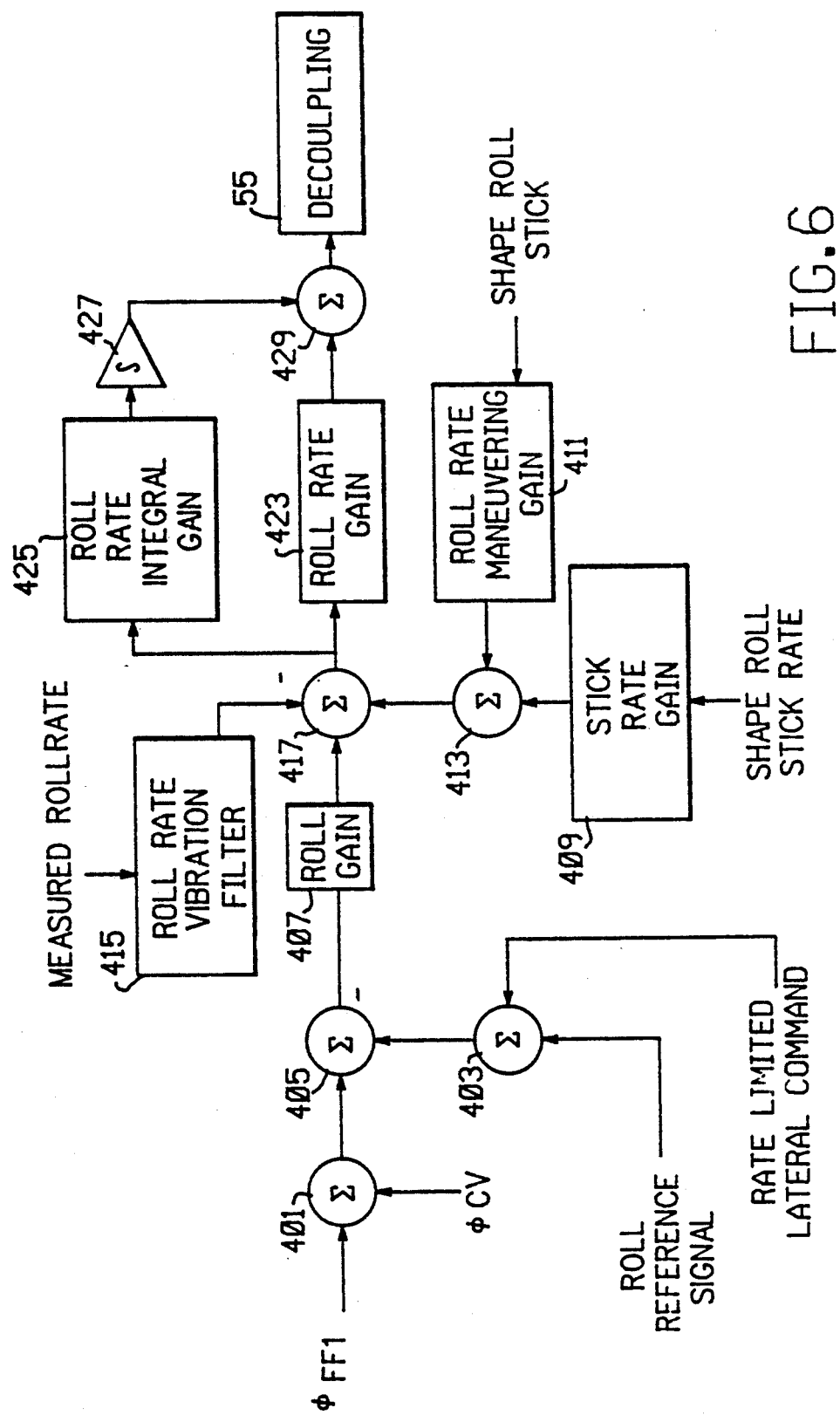
FIG. 6 is a block diagram of the roll stabilization control block incorporated into the conceptual block diagram of FIG. 2.

Referring to FIG. 6, the roll stabilization control diagram is illustrated. A signal $\phi_{FF1}$ is shown which emanates from acceleration feedforward block 339 of FIG. 5 $\phi_{FF1}$ is summed with the signal $\phi$cv from FIG. 5 in a summing junction 401.

At the bottom left of FIG. 6 a roll reference signal, obtainable from standardized data equipment, is summed with the rate limited lateral command from integrator 309 of FIG. 5 in a summing junction 403.

The output of summing junction 401 represents the total roll angle command from which is subtracted the measured roll attitude from summing junction 403 at summing junction 405 to produce a roll attitude error signal. The roll attitude error signal is multiplied by the gain from roll gain block 407.

Referring to the bottom of FIG. 6, the shaped roll stick rate signal is fed into stick rate gain block 409. Stick rate gain block 409 amplifies the shaped roll stick rate to provide a shaped roll stick rate from FIG. 5 to provide a roll rate feedforward term.

Referring to the lower right portion of FIG. 6, the shaped roll stick quantity is input into a roll rate maneuvering gain block 411. Roll rate maneuvering gain block 411 enables a roll maneuvering mode allowing direct stick command of roll rate instead of lateral acceleration. Mode logic is used to enable or disable block 411.

The output from stick rate gain block 409 and roll rate maneuvering gain block 411 is summed in a summing junction 413.

Referring to the top of FIG. 6, the measured roll rate signal is provided as an input to this system from a standard inertial navigation system or a rate gyro typically found in modern aircraft. Measured roll rate is filtered in roll rate vibration filter block 415.

The output of summing junction 413, roll gain block 407, and the negative of the filtered roll rate from roll rate vibration filter 415 are summed in a summing junction 417 to form a roll rate error signal.

The output of the summing junction 417 is fed into the input of a roll rate gain block 423. The output of the summing junction 417 is also fed into the input of a roll rate integral gain block 425 The output of the roll rate integral gain block 425 is fed to an integrator 427.

The output from integrator 427, and the output from roll rate gain block 423 are summed in a summing junction 429. The output of summing junction 429 is fed into the decoupling matrix 55 which was also shown previously on FIG.1.

Figure 7:
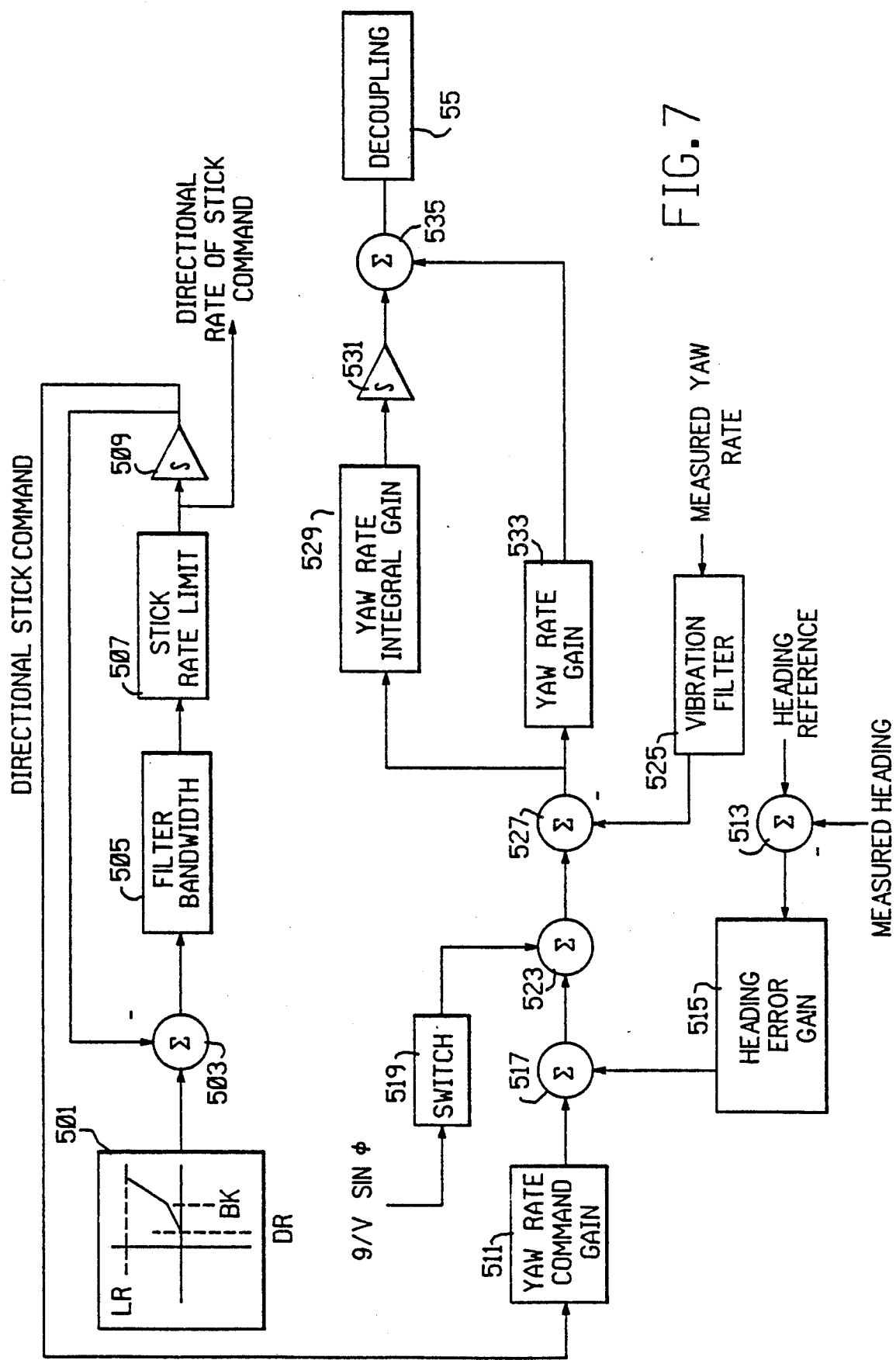
FIG. 7 is a block diagram of the directional stabilization control block.

Referring to FIG. 7, the directional stabilization control block diagram is illustrated. A stick shaping block 501 in the upper left hand portion of FIG. 7 illustrates the signal emanating from the stick of FIG. 1 as it is actuated in its directional orientation axis. The output from stick shaping block 501 is input to the stick filter comprised of blocks 503, 505, 507, and 509

The block 501 illustrates the extent of the stick limits from LR to zero, as well as a stick dead zone DR, and stick break point BK. The output of the gradient and limit control block 501 is fed into a feedback summing junction 503. The output of feedback summing junction 503 is fed into a filter bandwidth block 505. Filter bandwidth block 505 filters out the small transients in the signal due to vibrations in the aircraft and its effect on the pilot's hand as stick 11 of FIG. 1 is actuated.

The output of filter bandwidth block 505 is fed into a stick rate limit block 507. The output of the stick rate limit block 507 is the directional rate of stick command, and is in the form for introduction in subsequent figures. The output of the stick rate limit block 507 is fed into an integrator 509. The output of integrator 509 is the directional stick command. The output of integrator 509 is fed back into summing junction 501. The filtered directional stick command output of integrator 509 is fed into a yaw rate command gain block 511.

Near the bottom of FIG. 7 are a heading reference signal and a measured heading signal which are summed in a summing junction 513. The output of summing junction 513 is fed into a heading error gain block 515. Heading hold is triggered when the shaped directional stick command from block 509 is zero. When the stick command is non-zero, the heading reference is synchronized to the measured heading. When the stick command is zero, this synchronization stops, thereby forming a heading error signal at summing junction 513 The heading error gain block 515 is summed with the yaw rate command from block 511 at summing junction 517.

Above summing junction 517 a turn coordination term, $g/v \sin \phi$ is fed into a switch block 519. At higher speeds, switch 519 enables a turn coordination signal which sums with the output of summing junction 517 at summing junction 523 to produce the total yaw rate command. The turn coordination term is the predicted body axis yaw rate required to maintain a zero lateral acceleration, and is computed as g, the acceleration of gravity, divided by v, the forward velocity, and multiPlied by the sine of $\phi$, the roll angle.

The measured Yaw rate signal appears near the bottom right of FIG. 7 and is fed into a vibration filter block 525 and then negatively summed with the yaw rate command output of summing junction 523 at summing junction 527.

The output from summing junction 527 is fed into a yaw rate integral gain block 529. The output of directional control yaw rate integral gain block 529 is fed into an integrator 531. The output from summing junction 527 is also fed into a yaw rate gain block 533.

The output of yaw rate gain block 533 and the output of integrator 531 are fed into a summing junction 535. The output of summing junction 535 is fed directly into the decoupling block 55, as was previously shown in FIGS. 2, 4 and 6.

Figure 8:
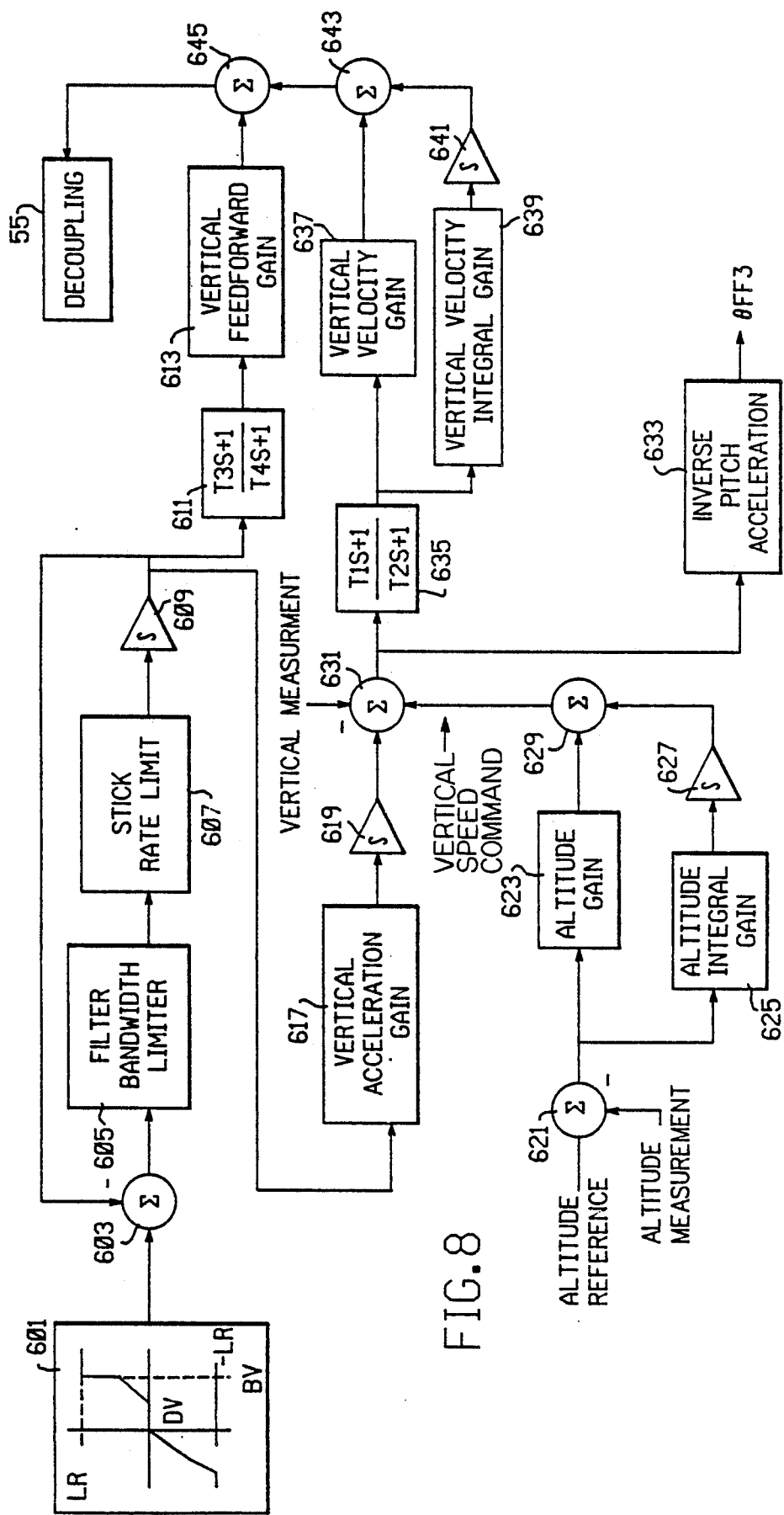
FIG. 8 is a block diagram of the vertical maneuvering command and stabilization control block.

Referring to FIG. 8, the vertical maneuvering command stabilization diagram is illustrated. A stick shaping block 601 in the upper left hand portion of FIG. 8 receives the signal emanating from the stick of FIG. 1 as it is actuated in its vertical axis. The output from stick shaping block 601 is input to the stick filter comprised of blocks 603, 605, 607, and 609.

The block 601 illustrates the extent of the stick limits from LR to −LR, as well as a stick dead zone DV, and stick break point BV. The output of the gradient and limit control block 601 is fed into a feedback summing junction 603. The output of feedback summing junction 603 is fed into a filter bandwidth block 605. Filter bandwidth block 605 filters out the small transients in the signal due to vibrations in the aircraft and its effect on the pilot's hand as stick 11 of FIG. 1 is actuated.

The output of filter bandwidth block 605 is fed into a stick rate limit block 607. The output of the stick rate limit block 607 is fed into an integrator 609. The output of integrator 609 is fed back into summing junction 601.

The shaped and filtered vertical stick output from integrator 609 is converted into a vertical acceleration command through a vertical acceleration gain block 617 and then into a vertical velocity command through an integrator block 619. When the vertical velocity has been commanded below a threshold, integrator block 619 is synchronized to zero velocity command and altitude reference, which is synchronized to the altitude measurement when the vertical speed command is greater than the threshold.

Near the left lower portion of FIG. 8, an attitude reference signal and an altitude measurement signal are input into a summing junction 621. The altitude measurement is subtracted from the altitude reference at summing junction 621 to form an altitude error signal. The altitude error signal from summing junction 621 is applied to an altitude gain block 623 and also to an altitude integral gain block 625. The output of altitude integral gain block 625 is integrated through an integrator 627 to remove any steady-state altitude error. The output of integrator 627 is summed with the proportional term from block 623 at summing junction 629 to form a vertical speed command due to an altitude error. A vertical measurement signal is located atop integrator 619. The vertical speed command due to an altitude error from summing junction 629 is summed with the vertical speed command from integrator 619 and the negative of the vertical speed measurement at summing junction 631 to form a vertical speed error signal.

The vertical speed error signal is input to inverse pitch acceleration block 633 which is the inverse of the pitch attitude to vertical acceleration model, to form a pitch attitude command $\theta_{FF3}$ which is an input appearing at FIG. 4. The pitch attitude to vertical acceleration model is a control relationship between the effect which pitch attitude has upon vertical acceleration. The vertical speed error signal is also input to a lead/lag compensation circuit 635 to increase phase margin in the vertical speed control loop. The output of block 635 is input to a vertical velocity gain block 637 and also to a vertical velocity integral gain block 639. The output of vertical velocity integral gain block 639 is integrated through an integrator 641 to remove any steady-state vertical speed error. The output of integrator 641 is summed with the proportional term from block 637 at summing junction 643 to form a vertical acceleration command due to vertical speed error.

The shaped and filtered vertical stick output of integrator 609 is also input into a lead/lag block 611 to provide a command feedforward for faster vertical response to stick inputs. The output of lead/lag block 611 is input to a vertical feedforward gain block 613 which is then summed with the vertical acceleration command from summing junction 643 at summing junction 645 to form a total vertical acceleration command signal.

The output of summing junction 645 is fed into decoupling block 55, the same decoupling block 55 as was previously illustrated in FIGS. 2, 4, 6, and 7.

Figure 9:
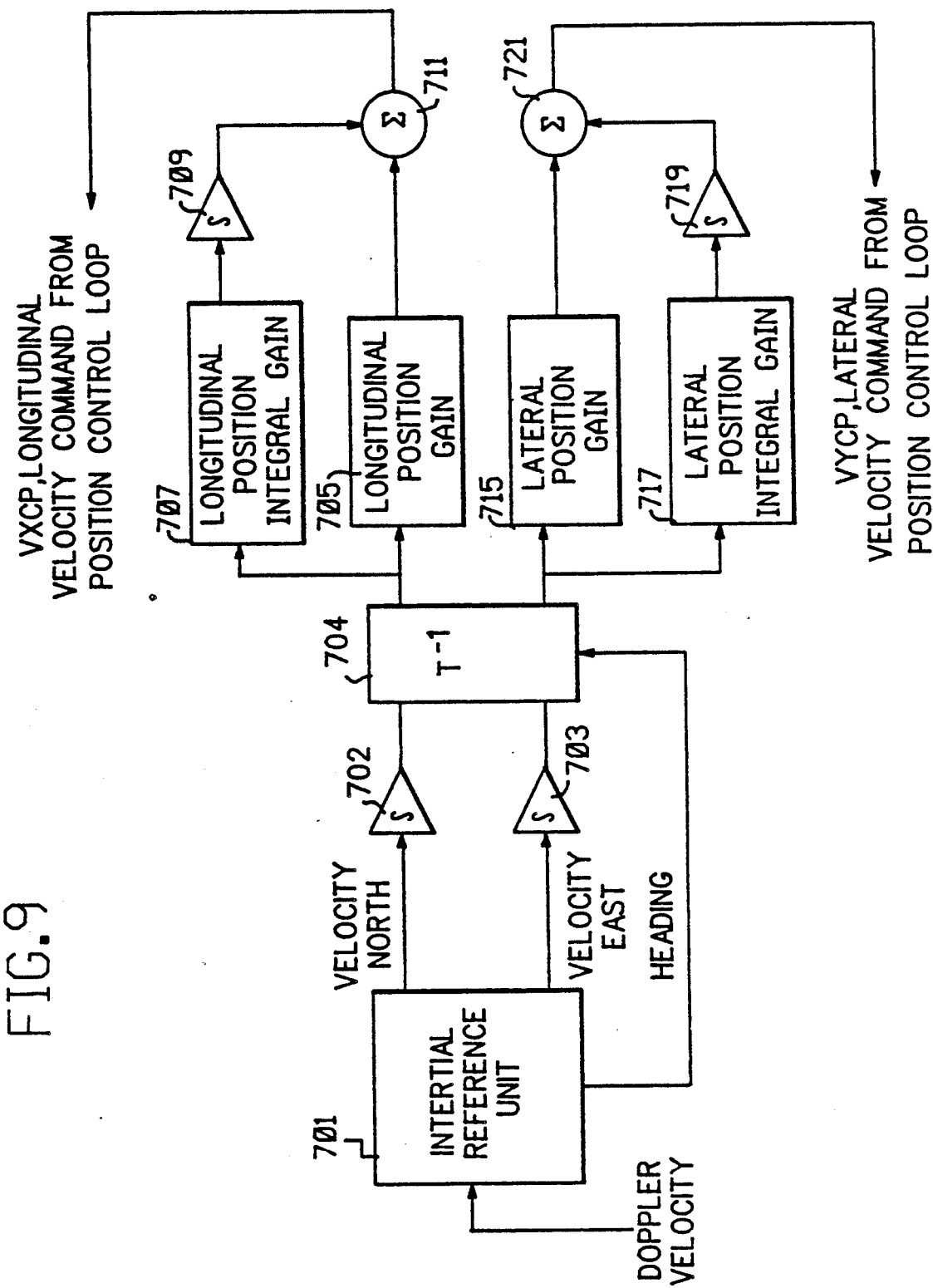
FIG. 9 is a block diagram of the hover position control block, without hover sensor, incorporated into the conceptual block diagram of FIG. 2.; and, FIGS. 10a and 10b are block diagrams the hover position control block, with hover sensor, incorporated into the conceptual block diagram of FIG. 2.

Referring to FIG. 9, the hover hold position control computation without hover sensor is shown. At the left side of FIG. 9, a doppler velocity input signal, potentially available from a ground reference radar unit (not shown), is fed into an inertial reference unit 701. A velocity north signal, a velocity east signal and a heading signal are generated by inertial reference unit 701.

The north and east velocity signals are integrated at integrators 702 and 703, respectively, to form north and east position errors. The two integrators 702 and 703 are synchronized to zero when position hold is not engaged. Position hold is engaged when longitudinal and lateral stick forces are both zero and the vector sum of longitudinal and lateral velocity commands is less than a prespecified velocity, in knots.

The north and east position error components are rotated into the aircraft body axes through the heading rotation block 704 to form longitudinal and lateral position error components. Each of these components are input to proportional plus integral controllers to produce velocity commands to maintain a zero position error and therefore hold position. The longitudinal axis position controller is embodied in longitudinal position gain block 705, longitudinal position integral gain block 707, integrator block 709 and summing junction block 711. The longitudinal velocity command from position control loop signal, VXCP, the output of summing junction 711, is an input to FIG. 3, shown on FIG. 3 as emanating from position computation block 123. The lateral axis position controller is embodied in lateral position gain block 715, lateral position integral gain block 717, integrator block 719 and summing junction block 721. The lateral velocity command from position control loop signal, VYCP, the output of summing junction 721, is an output to FIG. 5, shown emanating from position computation block 323.

Referring to FIGS. 10a and 10b, the hover hold position control computation without hover sensor is illustrated as an alternative means of determine position error.

A hover sensor is a subsystem on a helicopter that outputs longitudinal (X-Xo) and lateral (Y-Yo) position errors from a reference position. These error signals are inputs to the position controllers in FIGS. 10a and 10b.

The longitudinal position error (X-Xo) is input to the longitudinal position gain block 705 and to longitudinal position integral gain block 707, the output of which is integrated in integrator block 711. Summing junction 711 computes a longitudinal velocity command signal as the sum of the output of block 705 and block 709. VXCP, the output of summing junction 711, is an input to FIG. 3.

The lateral position error (Y-Yo) is input to the lateral position gain block 715 and to lateral position integral gain block 717, the output of which is integrated in integrator block 719. Summing junction 721 computes a lateral velocity command signal as the sum of the output of block 715 and block 719. VYCP, the output of summing junction 721, is an input to FIG. 5.

The description thus far has been in terms of analog controls and utilizing analog control symbology. Since control schemes are themselves a process, the operation of the present invention is embodied in the control schematics and figures illustrating it. The blocks of the control diagrams employ suitable gains, limits and integrating characteristics, and the summing of analog voltages to drive the relevant aircraft systems. However, the invention is practicable in a digital computer. Indeed, the best mode of implementation is in a digital computer. To practice the invention in aircraft utilizing computers, the voltage output of stick 11 of FIG. 1 would be accessed through various multiplexed inputs to the analog to digital converters and other electronic equipment to enable the proper accessing of input and output devices.

Signal processing may be accomplished by means of a table look up for constants followed by calculations using those constants or by computation of the constants using algorithms. The digital techniques required for implementing the various control functions shown herein are known, being currently utilized in various systems for piecemeal simplistic control for simple subsystems on aircraft of various types.

The invention is readily used with any suite of aircraft instrumentation existing in the current art, and indeed many of the inputs of the present invention may emanate from such systems. Since the present invention is best implemented digitally, the inputs from the aircraft sensor systems can be flexibly handled in utilizing their inputs into the system of the present invention.

The present invention has been described in terms of helicopters, and the control system of the present invention is especially well fitted to helicopter applications. However, the principles embodied herein are equally applicable to control systems utilized for fixed wing aircraft. In the case of a fixed wing aircraft, the pitch command would control the elevator of a fixed wing aircraft, the roll command would control the ailerons, and the yaw axis would control the rudder. The vertical axis could be used to control lift or power.

The forgoing disclosure and description of the invention are illustrative and explanatory thereof, and various changes in the gains, constants, and types of control,- (e.g. electrical, mechanical, pneumatic, etc. ) as well as in the details of the illustrated schematic may be made without departing from the spirit and scope of the invention.

We claim:

1. In an aircraft having control surfaces, an apparatus for controlling the velocity vector of said aircraft comprising:
   input means for inputting a signal indicative of desired flight performance;
   stabilization means for maintaining the velocity and orientation of said aircraft in the absence of input from said input means; and,
   decoupling means, connected to said input means and said means for maintaining the velocity and orientation, for generating a complex set of signals to said aircraft's control surfaces, to produce an aircraft motion only in the desired direction of flight, and wherein said decoupling means further comprises a matrix of coefficients which transform a commanded change in aircraft velocity in one direction into affirmative and compensating commands to said aircraft control surfaces to effect said change in aircraft velocity in one direction.

2. The apparatus for controlling the velocity vector of an aircraft as recited in claim 1 wherein said matrix of coefficients are representative of the state variables of said aircraft.

3. In an aircraft having control surfaces, an apparatus for controlling the velocity vector of said aircraft comprising:
   input means for inputting a signal indicative of desired flight performance;
   stabilization means for maintaining the velocity and orientation of said aircraft in the absence of input from said input means;
   decoupling means, connected to said input means and said means for maintaining the velocity and orientation, for generating a complex set of signals to said aircraft's control surfaces, to produce an aircraft motion only in the desired direction of flight; and,
   sensor means, connected to said decoupling means, for providing compensating inputs to said decoupling means based upon the state of said aircraft.

4. The apparatus for controlling the velocity vector of an aircraft as recited in claim 3 wherein said sensor means senses the aircraft angular rate, inertial velocity, and attitude.

5. In an aircraft having contorl surfaces, an appartaus for controlilng the velocity vector of said aircraft comprising:
   input means for inputting a signal indicative of desired flight performance;
   stabilization means for maintianing the velocity and orientation of said aircraft in the absence of input from said onput means; p1 decoupling means, connected to said input means and said means for maintaining the velocity and orientation, for generating a complex set of signals to said aircraft's control surfaces, to produce an aircraft motion only in the desired direction of flight; and,
   standard air data instrumentation connected to said decoupling means.

6. In an aircraft having control surfaces, an apparatus for controlling the velocity vector of said aircraft comprising:
   input means for inputting a signal indicative of desired flight performance:
   stabilization means for maintaining the velocity and orientation of said aircraft in the absence of input from said input means, wherein said stabilization means further comprises:
      sensing means for detecting aircraft inertial rate, aircraft attitude and aircraft velocity; and,
      means for computing aircraft control and stabilization response, connected to said sensing means, using said input means, aircraft inertial rate, aircraft attitude and aircraft velocity; and,
   decoupling means, connected to said input means and said means for maintaining the velocity and orientation, for generating a complex set of signals to said aircraft's control surfaces, to produce an aircraft motion only in the desired direction of flight.

7. The apparatus for controlling the velocity vector of an aircraft as recited in claim 6 wherein said sensing means further comprises:
   doppler radar sensor means for directing aircraft motion relative to any reference; and,
   inertial sensor means for detecting accellerational movement of said aircraft.

8. An apparatus for computing the control surface actuation commands for the control surface of an aircraft for forward and lateral acceleration commands, comprising:
   lateral command input means for inputting the desired amount of lateral movement said aircraft is to assume;
   forward command input means for inputting the desired amount of forward movement said aircraft is to assume;
   pitch change signal means for generating a signal indicative of the change in the pitch of said aircraft;
   roll attitude signal means for generating a signal indicative of the change in the roll of said aircraft;
   integration means, connected to said lateral command input means and said forward command input means, for integrating said commands;

filtration means, connected to said pitch change signal means and said roll attitude signal means, for filtering said signals;

means for measuring the rate of change of said commands; and, decoupling means, connected to said filtration means, said integration means and said means for measuring the rate of change of said commands, for generating a complex set of signals to said aircraft's control surfaces, to produce an aircraft motion only in the desired direction of flight.

9. An apparatus for computing the control surface actuation commands for an aircraft for vertical acceleration commands, comprising:

vertical command input means for inputting the desired amount of vertical movement said aircraft is to assume and outputting a vertical command signal;

filter means, connected to said vertical command input means for filtering said vertical command signal;

integration means, connected to said filter means, for integrating said vertical command signal;

comparator means, connected to said integration means, for comparing the difference between the integrated vertical command signal and a signal indicative of said aircraft's vertical velocity, and generating an error signal indicative of said comparison;

decoupling means connected to said comparator means, for generating a complex set of signals to the interrelated direct controls of said aircraft to produce acceleration in the desired direction of flight;

controller means, connected to said decoupling means, for actuating the control surfaces of said aircraft, in response to said complex set of signals, to effect vertical acceleration without significant changes in other aircraft flight characteristics.

10. The process of controlling an aircraft comprising the steps of:

commanding a change in velocity in at least one direction;

sensing the aircrafts current speed and orientation parameters;

processing said commanded change based upon the physical limitations of said aircraft and said sensed parameters to form a limited commanded change;

decoupling said commanded change into the constituent commands for each control surface necessary to effect said commanded change; and, actuating the control surfaces of an aircraft with said constituent commands.

11. The process of controlling an aircraft according to the steps of claim 10 and further comprising the steps of:

sensing the aircraft velocity;

setting the velocity command vector to zero when aircraft velocity has reached a threshold near zero and no affirmative changes in velocity are commanded, in order to fix the aircraft's position.

12. The process of controlling an aircraft according to the steps of claim 10 and further comprising the steps of:

sensing the aircraft velocity;

disengaging a turn coordination sequence when aircraft velocity falls below a speed threshold, in order to bypass eliminate the unnecessary turn coordination calculations when the aircraft is traveling at low speeds.

13. The process of claim 10 wherein said physical limitations of said aircraft comprise the kinetic energy available to the aircraft.

14. The process of claim 10 wherein said commanded change is transmitted by means of a command signal and said processing step further comprises the steps of:

limiting said command signal based upon the performance constraints of said aircraft;

filtering said command signal to remove unwanted transients;

summing said command signal with a trim signal representing earlier command signals; and, decoupling said command signal into a multiplicity of affirmative and compensating signals for each of the control surfaces of said aircraft to be affected by said command signal.

15. The process of claim 14 further comprising the step of actuating the control surfaces of said aircraft with said multiplicity of affirmative and compensating signals.

16. The process of claim 10 wherein said steps are performed using a digital computer.

17. The process of controlling a rotor wing aircraft comprising the steps of:

receiving an input velocity vector command;

computing the required change in pitch to implement said input velocity vector command;

computing the required change in roll to implement said input velocity vector command;

computing the required change in directional orientation to implement said input velocity vector command;

computing the required change in vertical acceleration to implement said input velocity vector command;

decoupling said computed required changes into a multiplicity of affirmative and compensating signals for each of the control surface inputs of said rotor wing aircraft, comprising the main rotor collective, the main rotor longitudinal cyclic, the main rotor lateral cyclic and the tail rotor collective.

18. The process of claim 17 wherein said steps are performed using a digital computer.

19. An apparatus for controlling attitudes, attitude rates, heading, heading rate, velocity vector and rate of change of velocity vector of an aircraft having controllable aerodynamic surfaces comprising:

means for inputting a signal, from a pilot's compliant control stick, which will effect various types of aircraft performance;

stabilization means for maintaining the velocity vector of the aircraft with respect to an earth fixed coordinate frame and the heating of the aircraft with respect to that velocity vector; and, decoupling means, connected to said means for inputting and said stabilization means, for actuating controls in all four axes of an aircraft such that aircraft velocity vector changes occur only in the controller/manipulator axis receiving a pilot input to thereby preclude the need for the pilot multi-axis control inputs to compensate for inherent aircraft coupling.

20. The apparatus described in claim 19, wherein said stabilization means further comprises:

means for detecting that the velocity vector reaches a threshold near zero;
means for automatically transitioning to a hover position hold control mode in response to said detection;
means for automatically latching a three dimensional hover position reference in response to the velocity vector further reaching a threshold near zero, which may be smaller than the transition threshold; and,
means for automatically controlling the aircraft to hold said hover position reference by generating velocity commands in three orthogonal axes in response to position errors relative to said reference, and wherein said means for detecting, said means for automatically transitioning, said means for automatically latching, and said means for automatically controlling, are all connected to said decoupling means.

21. An apparatus for responding to a vertical control stick input which will cause a vertical acceleration proportional to control stick vertical deflection and to applied force in the vertical direction comprising:

stabilization means for maintaining the aircraft's flight path angle in the absence of vertical control stick input; and, stabilization means for maintaining the aircraft's flight path angle during forward velocity changes via input from angular deflections of the control stick, wherein the vertical acceleration and flight path angle is controlled via a combination of aircraft pitch control and power control, and wherein the flight path angle changes are primarily caused by pitch changes at higher speeds and by power changes at lower speeds, and further comprising:
means for automatically controlling forward speed adjustment range to produce a speed adjustment range which varies from greater speed changes at higher speed to zero speed change as the aircraft approaches hover; and,
pilot speed adjustment range control means for further reducing the amount of forward speed change allowed by the automatic control, said means for automatically controlling and said pilot speed adjustment range control means connected to said stabilization means.

* * * * *